United States Patent
Zhang et al.

(10) Patent No.: US 12,125,990 B2
(45) Date of Patent: Oct. 22, 2024

(54) APPARATUS AND METHOD FOR POWER SUPPLY AND ELECTRONIC DEVICE

(71) Applicant: GUANGDONG OPPO MOBILE TELECOMMUNICATIONS CORP., LTD., Dongguan (CN)

(72) Inventors: Jialiang Zhang, Dongguan (CN); Hongbin Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 500 days.

(21) Appl. No.: 17/385,818

(22) Filed: Jul. 26, 2021

(65) Prior Publication Data

US 2021/0367278 A1    Nov. 25, 2021

Related U.S. Application Data

(63) Continuation of application No. PCT/CN2019/079322, filed on Mar. 22, 2019.

(51) Int. Cl.
*H02J 7/00* (2006.01)
*H01M 4/38* (2006.01)
(Continued)

(52) U.S. Cl.
CPC ......... *H01M 10/425* (2013.01); *H01M 4/386* (2013.01); *H01M 4/587* (2013.01); *H01M 10/0525* (2013.01); *H01M 10/441* (2013.01); *H01M 10/482* (2013.01); *H02J 7/0014* (2013.01); *H02J 7/007182* (2020.01);
(Continued)

(58) Field of Classification Search
USPC ........................................................ 320/118
See application file for complete search history.

(56) References Cited

U.S. PATENT DOCUMENTS

| | | | |
|---|---|---|---|
| 2005/0284676 A1* | 12/2005 | King ..................... | B60W 10/08 180/65.22 |
| 2011/0236751 A1* | 9/2011 | Amiruddin ......... | H01M 4/0447 429/188 |

(Continued)

FOREIGN PATENT DOCUMENTS

| | | |
|---|---|---|
| CN | 103794828 A | 5/2014 |
| CN | 203690990 U | 7/2014 |

(Continued)

OTHER PUBLICATIONS

The First Office Action dated Sep. 15, 2023 from Chinese application No. 201980087608.3.

(Continued)

*Primary Examiner* — Samuel Berhanu
(74) *Attorney, Agent, or Firm* — BAYES PLLC

(57) ABSTRACT

The present disclosure discloses an apparatus and a method for power supply and an electronic device. The apparatus for power supply includes a first battery and a second battery connected in series, a first voltage step-down module and a control module. The first battery is a silicon negative lithium ion battery. The control module is configured to control the voltage step-down module to step down the voltage of the first battery and the second battery to supply power based on power supply demands, in a power supply process.

17 Claims, 3 Drawing Sheets

(51) Int. Cl.
    *H01M 4/587* (2010.01)
    *H01M 10/0525* (2010.01)
    *H01M 10/42* (2006.01)
    *H01M 10/44* (2006.01)
    *H01M 10/48* (2006.01)
    *H01M 4/02* (2006.01)

(52) U.S. Cl.
    CPC ............. *H01M 2004/027* (2013.01); *H01M 2010/4271* (2013.01); *H02J 2207/20* (2020.01)

(56) References Cited

U.S. PATENT DOCUMENTS

| 2011/0248675 A1* | 10/2011 | Shiu | H02J 7/0016 320/118 |
| 2012/0268057 A1 | 10/2012 | Wu | |
| 2016/0059730 A1* | 3/2016 | Ishibashi | B60L 58/26 307/10.1 |

FOREIGN PATENT DOCUMENTS

| CN | 104253469 A | 12/2014 |
| CN | 105634057 A | 6/2016 |
| CN | 205509556 U | 8/2016 |
| EP | 2983000 A1 | 2/2016 |
| TW | 201117516 A | 5/2011 |

OTHER PUBLICATIONS

Supplementary Search Report Dated Apr. 12, 2022 From the Extended European search report(EESR) of the Application No. 19921764.7, 7 pages.
International Search Report and the Written Opinion Dated Dec. 17, 2019 From the International Searching Authority Re. Application No. PCT/CN2019/079322.
The Second Office Action dated Mar. 8, 2024 from Chinese application No. 201980087608.3.
The Examination Report dated Mar. 18, 2024 from European patent application No. 19921764.7.
The Third Office Action dated Jun. 6, 2024 from Chinese application No. 201980087608.3.
The Final Office Action dated Jul. 25, 2024 from Chinese application No. 201980087608.3.

* cited by examiner

In a power supply process, controlling the first voltage step-down module to step down voltage of the first battery and the second battery which are connected in series to supply power, based on power supply demand    401

APPARATUS AND METHOD FOR POWER SUPPLY AND ELECTRONIC DEVICE

CROSS REFERENCE TO RELATED APPLICATION

This application is a continuation of International Application No. PCT/CN2019/079322, filed on Mar. 22, 2019, the entire contents of which are incorporated herein by reference.

BACKGROUND

This application relates to the field of charging, and more particularly to an apparatus and a method for power supply and an electronic device.

Lithium ion batteries are commonly used for power supplying and energy storage in devices, such as intelligent terminals and electric cars. Lithium ion batteries with graphite negative electrodes are the most commonly used. Lithium ion batteries with graphite negative electrodes have lots of advantages such as low cost and low lithium intercalation potential. However, with the continuous improvement of functions of intelligent terminals and electric cars in recent years, users' demands have also been further increased. For example, wireless internet access, high speed data transmission, blue tooth connected to smart home, higher camera requirements and the adoption of 5G networks, all put higher requirements on a battery life of an electronic device.

SUMMARY

In a first aspect, the present disclosure provides an apparatus for power supply, including a first battery and a second battery connected in series, wherein, the first battery is a silicon negative lithium ion battery; a first voltage step-down module; a control module, configured to control the first voltage step-down module to step down voltage of the first battery and the second battery connected in series to supply power based on power supply demands, during a power supply process.

In a second aspect, the present disclosure provides a power supply method, applied to an electric device, wherein, the electric device includes a first battery and a second battery connected in series, the first battery is a silicon negative lithium ion battery; the method including during a power supply process, controlling a first voltage step-down module to step down voltage of the first battery and the second battery which are connected in series to supply power based on power supply demands.

In a third aspect, the present disclosure provides an electric device, wherein, including the above apparatus for power supply.

In a fourth aspect, the present disclosure provides a storage medium storing an executable program, wherein the executable program, when executed by a processor, implements the above power supply method.

DETAILED DESCRIPTION

Figure 1:
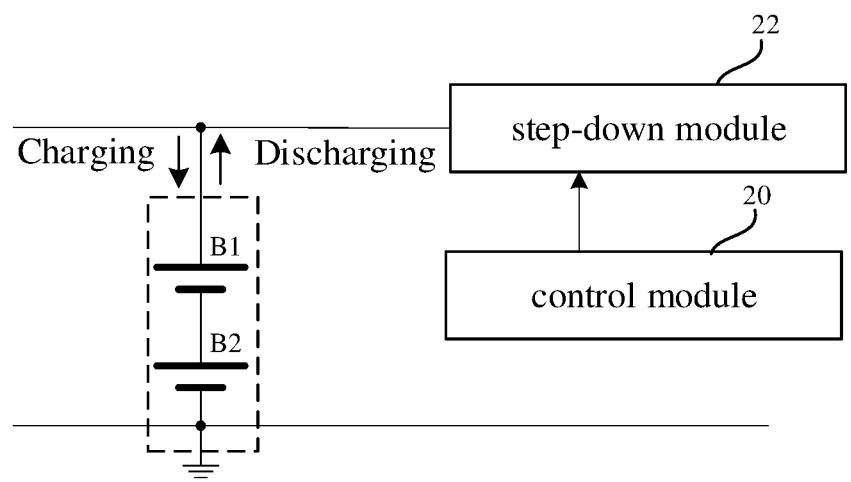
FIG. 1 is a schematic diagram of an apparatus for power supply in accordance with an embodiment of the present disclosure.

Technical schemes in embodiments of the present disclosure will be clearly and completely described below in conjunction with the drawings in the embodiments of the present disclosure. It may be understood that the specific embodiments described herein are only intended to explain the relevant disclosure, not limit the present disclosure.

Energy density, that is energy stored in an unit weight or an unit volume, is an important performance index of a battery. The key to improve energy density of a battery is to improve positive electrode materials and negative electrode materials, especially negative electrode materials. The common positive electrode materials of a lithium ion battery is metallic oxide, whereas negative electrode materials is graphite.

The energy density of the most commonly used lithium ion battery with graphite negative electrode is 500~700 Wh/L, and charge rate is about 0.5~3 C. However, this kind of lithium ion battery cannot meet users' demand of endurance of an electronic device.

The factor, such as the energy density and the specific capacity of the negative electrode, will affect the endurance of an electronic device. In order to improve endurance of a battery, the battery needs to be improved.

In an embodiment of the present disclosure, in order to improve the energy density of a battery, a lithium ion battery with silicon negative electrode is used as a power supply battery. The operating voltage range of a graphite negative lithium ion battery is 3.4~4.45V, and the operating voltage range of a silicon negative lithium ion battery is 2.5~4.45V or 3.0~4.45V. Thereof, a discharging cut-off voltage of a graphite negative lithium ion battery is commonly set as 3.4V, a discharging cut-off voltage of a silicon negative lithium ion battery can be set as any voltage values between 2.5~3.0V.

Take an intelligent terminal as an example, as the minimum working voltage of software in the intelligent terminal are set as about 3.2V, a shutdown protection voltage for the intelligent terminal is set as about 3.4V so that the intelligent terminal can work well.

If a silicon negative lithium ion battery is used in an intelligent terminal and the shutdown protection voltage is set as 3.4V, power of the silicon negative lithium ion battery cannot be used effectively, as the discharging cut-off voltage of the silicon negative lithium ion battery is 2.5~3.0V.

In some embodiments, the system of the electronic device may be adjusted to match voltage range of the silicon negative lithium ion battery in order to make full use of the power of the silicon negative lithium ion battery. In other words, it is necessary to modify system software and circuits of electronic device, so that the minimum working voltage of the system can be reduced, for example, to 3.0V. In other embodiments, on the discharge path of a silicon negative lithium ion battery, a boost circuit (for example, a DC-DC converter) may be used, so that voltage of the silicon negative lithium ion battery can be raised to 3.4V to supply to the system when voltage of the silicon negative lithium ion battery is below 3.4V. Thus, the silicon negative lithium ion battery can continue to supply power to the system when voltage is between 2.5~3.4V.

Through the above two ways, power of the silicon negative lithium ion battery can be effectively used and endurance of an electronic device can be improved. However, it also brings the following problems. Through the way of modifying voltage range of the system to match voltage range of the silicon negative lithium ion battery, the whole system architectures need to be modified and the power supply system of electronic device needs to be adjusted, which will bring high disclosure cost. Through the way of modifying circuits, which is based on a single silicon negative lithium ion battery, the terminal's endurance capacity can be improved. However, due to the poor charging rate performance of the silicon negative lithium ion battery and an additional boost circuit is needed, it will lead to energy waste.

In an embodiment of the present disclosure, a silicon negative lithium ion battery and an additional battery are used, which will improve charging speed comparing with just one battery is used, and can improve battery energy density comparing with a graphite negative lithium ion battery is used.

Referring to FIG. 1, which is a schematic diagram of an apparatus for power supply in an embodiment of the present disclosure. The apparatus for power supply 100 includes a first battery B1 and a second battery B2 connected in series, a control module 20 and a first step-down module 22. Wherein, the first battery B1 is a silicon negative lithium ion battery. The control module 20 is configured to control a power supply process of the first battery and the second battery connected in series based on charging demand of the first battery and the second battery connected in series, and to control the power supply process of the first battery and the second battery connected in series in response to receive a power supply instruction.

In an embodiment of the present disclosure, the charging demand includes charging voltage demand and charging current demand. In some embodiments, current and voltage of a battery can be detected by a voltammeter, thereby charging demand of the battery can be determined. The control module controlling the power supply process of the first battery and the second battery includes at least one of the following ways: controlling the power supply process to start or to stop, controlling charging voltage and current during the power supply process, or controlling charging duration of the power supply process. For example, modules such as a switch module and a boost-buck module can be configured on the charging path between a charging interface and the first battery and the second battery connected in series. Through controlling these modules, the control module can control the power supply process. Furthermore, the first battery B1 and the second battery B2 can also be connected with a battery protection plate to ensure safety of the batteries' charging process and discharging process. The battery protection plate can include a controller, which can achieve over-charging protection, over-discharging protection, over-current protection, short circuit protection, output short circuit protection and so on. The control module 20 can be connected with the controller in the battery protection board to achieve the controlling of the charging and discharging process of the battery.

In an embodiment of the present disclosure, the first battery B1 and the second battery B2 are used to supply power to power-demanding systems. Power-demanding systems include a processor, a display, a sound player device and other modules or systems which need power to drive in order to work normally. Taking an intelligent terminal as an example, the power-demanding systems can include an disclosure processor, a camera module, a radio frequency module, a display screen and other modules which need power supplying. When the power-demanding systems need power, corresponding power supply demand instructions are generated by these systems. The control module 20 can control the power supply process based on the first battery B1 and the second battery B2 to start. For example, power supply demand instructions will be generated when the camera module of the intelligent terminal is turned on, the display screen is turned on or call function is turned on by a user. Power demand instructions can be generated by the disclosure processor and be sent to the control module 20. When the power supply demand is stopped, or when voltage of the first battery B1 or the second battery B2 reaches its discharge cut-off voltage, the control module 20 controls the power supply process of the first battery B1 and the second battery B2 to stop.

When the first battery B1 and the second battery B2 are in a state of supplying power, voltage of the first battery B1 and the second battery B2 connected in series can be stepped down according to a voltage demand of the power-demanding systems. The control module 20 is used to control the first step-down module to step down voltage of the first battery and the second battery connected in series according to the power supply demand during the power supply process.

In an embodiment of the present disclosure, the second battery can be at least one of a graphite negative lithium ion battery, a silicon negative lithium ion battery, or Sn negative lithium ion battery.

In an embodiment of the present disclosure, the negative materials of the silicon negative lithium ion battery (i.e. the first battery B1) is at least one of the following materials: Si, SiC or SiO. In another embodiment of the present disclosure, the negative materials of the silicon negative lithium ion battery (i.e. the first battery B1) is made from at least one of Si, SiC or SiO mixed with graphite, wherein the content of Si is greater than 0% and less than 100%.

Figure 2:
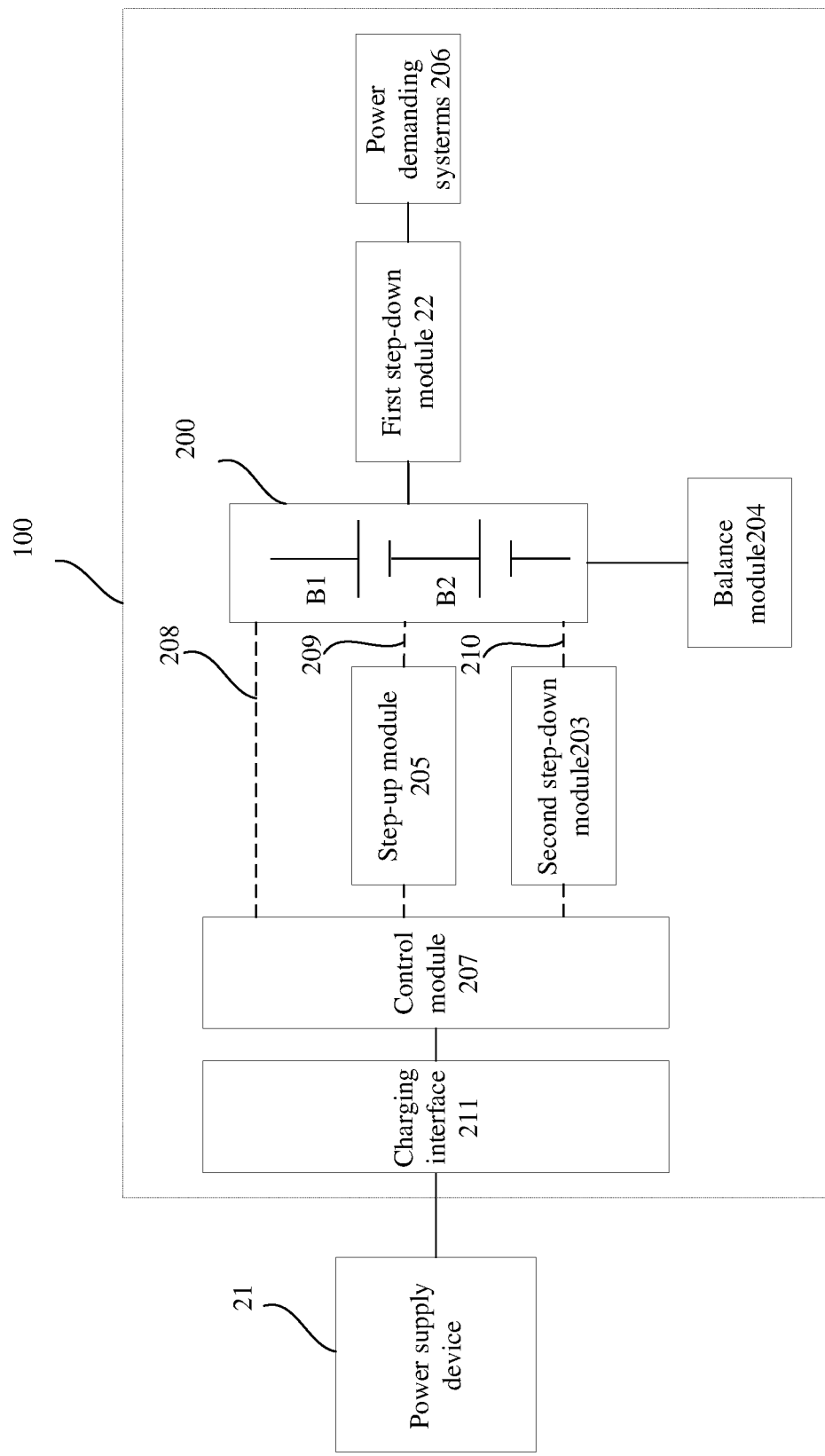
FIG. 2 is a schematic diagram of an apparatus for power supply in accordance with another embodiment of the present disclosure.

Referring to FIG. 2, which is a schematic diagram of an apparatus for power supply in accordance with another embodiment of the present disclosure. The apparatus for power supply includes a battery module 200, the first step-down module 22, a second step-down module 203, an balance module 204, a step-up module 205, power demanding systems 206, a control module 207 and a charging interface 211. The battery module 200 contains the first battery B1 and the second battery B2 connected in series.

The apparatus for power supply 100 can be connected with the power supply device 21 through the charging interface 211. The power supply device 21 is configured to supply power to the apparatus for power supply 100. The power supply device 21 can be a device which can supply power, such as a power adapter, a power bank or a car charger and so on.

Referring to FIG. 2, the apparatus for power supply 100 includes at least one of the following charging paths: a directly charging path 208, a step-up charging path 209 or a step-down charging path 210.

Charging Process.

The control module 207 controls the directly charging path 208 to be turned on, when the charging voltage provided by the power supply device 21 can meet the charging demand of the battery module 200. Thereof, the charging voltage provided by the power supply device 21 can enter into the battery module 200 directly. The directly charging path 208 can be a wire. In an embodiment, a switch can be configured on the wire to implement a turn-on or turn-off state of the directly charging path 208.

In an embodiment of the present disclosure, the step-up module 205 is configured on the step-up charging path 209, and is configured to step up the input voltage provided by the power supply device 21, to satisfy the charging voltage demand of the battery module 200.

Since the battery module 200 includes a silicon negative lithium ion battery B1 and a graphite negative lithium ion battery B2 connected in series, when the charging voltage provided by the power supply device 21 cannot satisfy the charging voltage demand of the battery module 200, the control module 207 controls the step-up charging path 209 to be turned on. In this way, input charging voltage provided by the power supply device 21 can be stepped up by the step-up module 205, and then be provided to the battery module 200.

In an embodiment of the present disclosure, the second step-down module 203, such as a Buck circuit, a charge pump, etc., can be configured on the step-down charging path 210 to step down charging voltage provided by the power supply device 21 to provide to the battery module 200. The control module 207 is configured to control the step-down charging path 210 to be turned on.

In addition, the step-up charging path 209 and the step-down charging path 210 can also be combined into one charging path. A buck-boost module, such as a Buck-Boost circuit, can be configured on the combined charging path, to achieve step-up charging or step-down charging.

The power supply module 100 may be configured in an electronic device, which may be an intelligent terminal, a notebook computer, a drone, an e-book, a tablet computer, an electronic cigarette, a smart electronic device (for example, a watch, a bracelet, smart glasses, a sweeping robot, etc.), and other electronic products (for example, wireless headsets, Bluetooth speakers, electric toothbrushes, rechargeable wireless mice, etc.).

When the battery module 200 is charged through the direct charging path 208 of the above three charging paths, since the charging voltage provided by the power supply device 21 can directly enter into the battery without being stepped down or stepped up, energy loss and heat which are generated by a step-down or a step-up processing can be solved. When the battery module 200 is charged in this way, the electronic device and the power supply device 21 can perform two-way communication (for example, the electronic device can implement a wired communication with the power supply device 21 through a data line in the charging interface 211 of the electronic device, or the electronic device can communicate with the power supply device 21 through a wireless communication module).

The electronic device can detect a voltage and a current of each battery in the battery module 200 and feed them back to the power supply device 21. Therefore, in order to meet the changing demands of the electronic device, the power supply device 21 can adjust output charging voltage and current according to voltage and current of the battery fed back by the electronic device.

It should be understood that the information fed back by the electronic device is not limited to the voltage and the current of the battery, but may also be information such as battery capacity information and temperature information which can be used to determine charging voltage and current.

In an embodiment of the present disclosure, the electronic device and the power supply device 21 can communicate with each other to determine which one of the above three charging paths is used for charging. For example, the power supply device 21 can send charging voltage information it can provide to the electronic device. Therefore, the electronic device can determine to use which charging paths according to the charging voltage information provided by the power supply device and charging voltage requirements of the battery module 200. In some embodiments, the power supply device 21 can send specific information to the electronic device, for example, model information of the power supply device 21. The specific information corresponds to charging voltage that can be provided by the power supply device 21. Therefore, the electronic device can determine which charging path should be turned on according to the specific information.

In some embodiments, the electronic device can also actively detect the power supply device 21 to determine charging voltage that can be provided by the power supply device 21. For example, if the power supply device 21 is a computer, through a protocol interaction, the electronic device can determine that the power supply device 21 is a computer and can only provide a charging voltage of 5V. Therefore, the step-up charging path 209 needs to be turned on for charging.

Figures 3, 4:
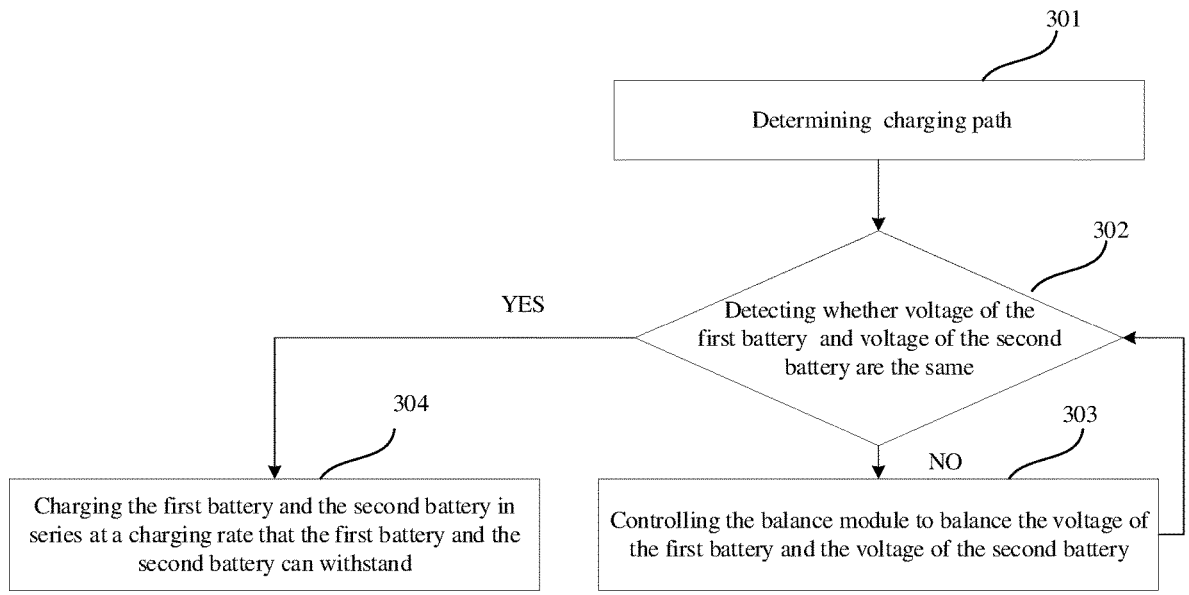
FIG. 3 is a flowchart of charging process in accordance with an embodiment of the present disclosure.
FIG. 4 is a flowchart of power supply method in accordance with an embodiment of the present disclosure.

Referring to FIG. 3, which is a flowchart of charging process in accordance with an embodiment of the present disclosure. In step 301, the above-mentioned method is adopted to determine which charging path is used. After the charging path is determined, the power supply device 21 outputs voltage and current to charge the battery module 200.

In an embodiment, before charging the first battery and the second battery connected in series, in step 302, the method includes detecting voltage of the first battery B1 and voltage of the second battery B2. When voltage of the first battery B1 and voltage of the second battery B2 are different, in step 303, the method includes controlling the balance module 204 to balance voltage of the first battery B1 and voltage of the second battery B2. When voltage of the first battery B1 and voltage of the second battery B2 are the same, in step 304, the method includes controlling a charging process for charging the first battery B1 and the second battery B2 to start.

In some other embodiments of the present disclosure, before starting the charging process, voltage of the two batteries may be detected first. If voltage of the two batteries are different, the balance module 204 is used to balance to make voltage of the two batteries the same. Alternatively, in some embodiments, the battery with a low voltage may be charged first until voltage of the two batteries are the same, and then the two batteries are charged in series.

The lithium ion battery with silicon negative and the lithium ion battery with graphite negative can withstand different charge rates. The charge rate of a graphite negative lithium ion battery can be 0.5~3 C, and the charge rate of a silicon negative lithium ion battery can be 1 C. Therefore, during the charging process, the charging rate should not be set higher than 1 C. In addition, during the charging process, voltage of the silicon negative lithium ion battery and voltage of the graphite negative lithium ion battery are detected, and when voltage of any battery reaches its corresponding charging cut-off voltage, the charging process is stopped.

When the battery module 200 is charged in a CC-CV (constant current-constant voltage) mode, the charging cut-off voltage of the constant current charging stage can be set to Vs. During the charging process, the balance module 204 is used to balance voltage between the silicon negative lithium ion battery and the graphite negative lithium ion battery by means of power transfer. The balance module 204 can adopt an active balance method to transfer power between the two batteries. For example, the balance module 204 can be a CUK balance circuit, a voltage regulator type balance circuit, and the like. In some embodiments, the balance module 204 may also adopt a passive balance method, for example, a method in which a resistor is used to consume power.

When voltage of any battery reaches Vs, the charging process enters into a constant voltage charging stage from the constant current charging stage. In the constant voltage charging stage, constant charging voltage can be at a voltage value of Vs or less, until a charging stop condition is met, the charging process is stopped. The charging stop condition may be that the charging current is less than a preset value or the time for charging with the constant charging voltage reaches a preset time value. In an embodiment of the present disclosure, the charging process of the battery module 200 may include one or more of a trickle charging phase, a constant current charging phase, and a constant voltage charging phase.

In an embodiment of the present disclosure, in order to increase a charging speed, the charging voltage and the charging current can be controlled to shorten the charging duration of the constant voltage charging phase, or the constant voltage charging phase can be eliminated. For example, in some embodiment, the charging cut-off voltage of the constant current charging stage may be set to a value of Vn which is higher than the preset cut-off voltage of a graphite negative lithium ion battery or a silicon negative lithium ion battery. The preset value is related to the system of a battery and the used materials of a battery. For example, for a graphite negative lithium ion battery, the preset cut-off voltage is about 4.2V to 4.4V. Vn can be a value increased by any value between 0.05V and 0.1V on the basis of the preset cut-off voltage. For example, the charge cut-off voltage can be set to 4.45V.

When charging a silicon negative lithium ion battery and a graphite negative lithium ion battery connected in series, it is necessary to monitor whether voltage of each cell reaches the charging cut-off voltage. When voltage of any battery reaches the charging cut-off voltage, it is necessary to perform a switching operation of the charging phase. Alternatively, in some embodiment, the charging path of the battery which reaches its charging cut-off voltage can be disconnected, and the battery that has not reached the preset cut-off voltage or a limit voltage can be continuously charged, so that voltage of the two batteries can reach the charging cut-off voltage respectively.

In the embodiments of this disclosure, by using a silicon negative lithium ion battery connected in series with other batteries, charging voltage can be increased (charging voltage can be set greater than or equal to a sum of required voltages of the two batteries), thus charging speed can be increased compared with using a silicon negative lithium ion battery alone.

Power Supply Process.

Referring to FIG. 2, in an embodiment of the present disclosure, the first step-down module 22 is configured on the power supply path that is used to supply power to the power demand systems from the battery module 200. The first step-down module 22 is used to step down voltage of the battery module 200 according to voltage demand of the power demand systems 206 to supply power to the power demand systems 206. In some embodiment, the first step-down module 22 can be a half-voltage circuit, a Buck circuit, or the like.

The battery B1 and the battery B2 are connected in series, so discharging current of the two batteries are the same during discharging process. That is, the two batteries discharge a same amount of electricity at the same time.

As mentioned above, when the graphite negative lithium ion battery and the silicon negative lithium ion battery are all fully charged, voltage of the two batteries are the same, for example, both are 4.45V. Therefore, when the graphite negative lithium ion battery and the silicon negative lithium ion battery discharge at the same time to supply power to the power demand systems 206, since the discharge cut-off voltage of the graphite negative lithium ion battery is higher than that of the silicon negative lithium ion battery, the discharge cut-off voltage of the battery module 200 can be set to the discharge cut-off voltage of the graphite negative lithium ion battery. That is, stopping supply power to the power demanding system 206, when voltage of the graphite negative lithium ion battery reaches its discharge cut-off voltage.

According to the discharge characteristics of the silicon negative lithium ion battery and the graphite negative lithium ion battery, voltage of the silicon negative lithium ion battery (i.e., the battery B2) will drop faster when the same capacity is released. For example, when voltage of a graphite negative lithium ion battery is 3.4V, voltage of a silicon negative electrode lithium ion battery is about 3.2V. At this time, voltage of the graphite negative lithium ion battery reaches its discharging cut-off voltage.

When both batteries are fully charged, the highest voltage that the battery module 200 can provide during power supply process is, for example, 8.9V. Voltage provided by the battery module 200 is reduced by the first step-down module 22 to supply to the power demanding systems 206. When voltage of the battery B1 reaches its discharge cut-off voltage (for example, 3.4V), stop supply power to the power demanding systems 206.

It should be understood that the discharging cut-off voltage can be set based on actual use conditions, and the embodiment of the present disclosure does not limit this. For example, when the battery module 200 is used in an electric device, the discharge cut-off voltage can be set to 3.0V.

During the power supply process, the balance module 204 can also balance voltage of the two batteries by means of power transfer, so that voltage of the two batteries are the same.

In some embodiment, during the power supply process, the balance module 204 may not be used for balancing. In this case, as the discharge cut-off voltage is the discharging cut-off voltage of the battery B1, when the battery module 200 stops supplying power to the power demand systems 206, voltage of the silicon negative lithium ion battery is lower than that of voltage of the graphite negative lithium ion battery. When the battery module 200 is charged, voltage of the batteries are detected firstly, and voltage of the two batteries are balanced by the balance module 204 when voltage of the two batteries are different to make voltage of the two batteries the same, or the battery with lower voltage is charged firstly until voltage of the two batteries are the same.

It should be understood that, in the embodiment of the present disclosure, the silicon negative lithium ion battery can also be replaced by an Sn negative lithium ion battery.

In the embodiments of the present disclosure, by using the silicon negative lithium ion battery connected in series with other batteries, the power supply voltage can be the sum of voltage of the two batteries, thereby it is not need to adjust the system architecture or add a boost circuit. Due to the high energy density of silicon negative lithium ion battery, when connected in series with other battery, the same amount of electricity is released, voltage of the silicon negative lithium ion battery drops more rapidly. Therefore, when voltage of the graphite negative lithium ion battery is 3.4V, voltage of the silicon negative lithium ion battery is lower than 3.4V, which can be about 3.2V. Voltage of the silicon negative lithium ion battery can be fully used.

Referring to FIG. 4, which is a flowchart of a power supply method according to an embodiment of the present disclosure. The power supply method can be applied to an electronic device, and the electronic device includes a first battery B1 and a second battery B2 connected in series. The method includes the followings.

In step 401, in a power supply process, the method includes controlling the first voltage step-down module to step down voltage of the first battery and the second battery which are connected in series to supply power, based on power supply demand.

During a charging process and a power supply process, the method further includes controlling the balance module to balance voltage of the first battery B1 and the second battery B2, so that voltage of the first battery B1 and the second battery B2 are the same during the charging process and the power supply process. In one embodiment, a discharge cut-off voltage of the first battery B1 is lower than a discharge cut-off voltage of the second battery B2. Therefore, when voltage of the second battery reaches its discharge cut-off voltage, the power supply process is controlled to stop.

The method further includes detecting voltage of the first battery and voltage of the second battery before the first battery and the second battery connected in series are charged; controlling the balance module to balance voltage of the first battery and voltage of the second battery in response to voltage of the first battery and voltage of the second battery are different; and controlling a charging process of the first battery and the second battery to start in response to voltage of the first battery and voltage of the second battery are the same.

The method further includes detecting voltage of the first battery and voltage of the second battery before the first battery and the second battery connected in series are charged; controlling a charging process of the battery with lower voltage to start to charge the battery with lower voltage; and controlling a charging process of the first battery and the second battery connected in series to start in response to voltage of the first battery and voltage of the second battery are the same.

Correspondingly, the present disclosure also provides a storage medium that stores an executable program, and when the executable program is executed by a processor, the foregoing power supply method is implemented.

In the above embodiments, implementation may be made in whole or in part in software, hardware, firmware or any combination thereof. When implemented by software, they can be implemented in the form of a computer program product in whole or in part. The computer program product includes one or more computer instructions. When the computer program instructions are loaded and executed on a computer, the processes or functions described in the embodiments of the present disclosure are provided in whole or in part. The computer may be a general purpose computer, an disclosure specific computer, a computer network, or any other programmable device. The computer instructions may be stored in a computer-readable storage medium or transmitted from one computer readable storage medium to another. For example, the computer instructions may be transmitted from one website, computer, server, or data center to another via a wired (such as coaxial cable, optical fiber, Digital Subscriber Line (DSL)) or wireless (such as infrared, wireless, microwave, etc.) connection. The computer readable storage medium may be any usable medium that can be accessed by a computer or a data storage device such as a server or a data center integrated with one or more usable medium. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)), etc. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)), etc.

It can be appreciated by those skilled in the art that the units and the steps of the algorithm of examples described in combination with the embodiments disclosed herein may be implemented in electronic hardware or a combination of computer software and electronic hardware. Whether these functions are executed in hardware or software depends on specific disclosures and design constraint conditions of technical solutions. For each specific disclosure, professionals and technicians can use different methods to implement the described functions, but such implementation should not be considered beyond the scope of the present disclosure.

In several embodiments provided by the present disclosure, it is to be understood that, the system, apparatuses and methods disclosed in several embodiments provided by the present disclosure can be implemented in any other ways. For example, the apparatus embodiments described above can be merely exemplary. For example, the units are merely divided based on logic functions. In practical implementation, the units can be divided in other manners. For example, multiple units or components can be combined or integrated into another system, or some features can be omitted or not executed. In addition, mutual coupling or direct coupling or communication connection described or discussed can be achieved via some interfaces, and indirect coupling or communication connection between apparatuses or units may be electrical, mechanical or of other forms.

The units illustrated as separate components can be or not be separated physically, and components described as display units can be or not be physical units, i.e., can be located at one position, or can be distributed onto multiple network units. It is possible to select some or all of the units according to actual needs, for achieving the objective of embodiments of the present disclosure.

In addition, respective functional units in respective embodiments of the present disclosure can be integrated into one processing unit, or can be present as separate physical entities. It is also possible to integrate two or more units into one unit.

The embodiments of the present disclosure are described in detail above with reference to the accompanying drawings. However, the present disclosure is not limited to the specific details in the foregoing embodiments. Within the scope of the technical concept of the present disclosure, many simple modifications can be made to the technical solutions of the present disclosure. These simple variants all belong to the protection scope of this disclosure.

In addition, it should be noted that the various specific technical features described in the above-mentioned specific embodiments can be combined in any suitable manner without contradiction. In order to avoid unnecessary repetition, this disclosure provides various possible combinations. The combination method will not be explained separately.

In addition, various different implementations of this disclosure can also be combined arbitrarily, as long as they do not violate the idea of this disclosure, they should also be regarded as the content disclosed in this disclosure.

The above description merely illustrates specific implementations of the present disclosure, but the scope of the present disclosure is not limited by the specific implementations. Any change or replacement within the technical scope disclosed by the present disclosure that can be easily conceived by a technical person familiar with the technical field of the present disclosure should fall in the scope of the present disclosure, which is defined only by the claims as attached.

What is claimed is:

1. An apparatus for power supply, comprising:
   a first battery which is a silicon negative lithium ion battery;
   a second battery which is a graphite negative lithium ion battery, wherein the graphite negative lithium ion battery is connected in series with the silicon negative lithium ion battery;
   a voltage step-down module; and
   a control module configured to control the voltage step-down module to step down the voltage of the first battery and the second battery to supply power based on power supply demands, in a power supply process;
   wherein a discharge cut-off voltage of the first battery is lower than a discharge cut-off voltage of the second battery, and the control module is configured to control the power supply process to stop discharge in response to determining that the voltage of the second battery reaches the discharge cut-off voltage of the second battery.

2. The apparatus according to claim 1, further comprising:
   a balance module, configured to balance the voltage of the first battery and the voltage of the second battery, so that the voltage of the first battery and voltage of the second battery are the same during the power supply process.

3. The apparatus according to claim 1, wherein the control module is further configured to control the balance module to balance the voltage of the first battery and the voltage of the second battery, so that the voltage of the first battery and the voltage of the second battery are the same, after the power supply process is stopped.

4. The apparatus according to claim 1, further comprising:
   a charging interface, wherein the control module is further configured to control voltage and current inputted into the charging interface to directly load on the first battery and the second battery, to charge the first battery and the second battery.

5. The apparatus according to claim 1, further comprising:
   a voltage step-up module, configured to step up a received charging voltage to charge the first battery and the second battery.

6. The apparatus according to claim 1, further comprising:
   another voltage step-down module, configured to step down a received charging voltage to charge the first battery and the second battery.

7. The apparatus according to claim 1, wherein the control module is further configured to:
   detect the voltage of the first battery and the voltage of the second battery before the first battery and the second battery are charged;
   control a balance module to balance the voltage of the first battery and the voltage of the second battery in response to the voltage of the first battery and the voltage of the second battery being different; and
   control a charging process of the first battery and the second battery to start after the voltage of the first battery and the voltage of the second battery are the same.

8. The apparatus according to claim 1, wherein the control module is further configured to:
   detect the voltage of the first battery and the voltage of the second battery before the first battery and the second battery are charged;
   control a charging process of the battery with a lower voltage to start in response to the voltage of the first battery and the voltage of the second battery being different; and
   control a charging process of the first battery and the second battery to start after the voltage of the first battery and the voltage of the second battery are the same.

9. The apparatus according to claim 1, wherein the step-down module is a half-voltage circuit or a Buck circuit.

10. The apparatus according to claim 1, wherein an energy density of the first battery and an energy density of the second battery are different, and the energy density of the first battery is higher than the energy density of the second battery.

11. The apparatus according to claim 1, wherein the negative material of the silicon negative lithium ion battery is at least one of the following materials: Si, SiC or SiO; or
   the negative material of the silicon negative lithium ion battery is made from at least one of Si, SiC or SiO mixed with graphite, wherein the percentage of Si is greater than 0% and less than 100%.

12. The apparatus according to claim 1, wherein the voltage of the first battery and the voltage of the second battery are different when the power supply process is stopped; and
   the control module is further configured to control a balance module to balance the voltage of the first battery and the voltage of the second battery before the first battery and the second battery are charged in series, or to control the battery with a lower voltage to be charged firstly before the first battery and the second battery are charged in series.

13. A method for power supply, applied to an electric device, wherein the electric device comprises a first battery and a second battery, the first battery is a silicon negative lithium ion battery, the second battery is a graphite negative lithium ion battery, the graphite negative lithium ion battery is connected in series with the silicon negative lithium ion battery, and a discharge cut-off voltage of the first battery is lower than a discharge cut-off voltage of the second battery, the method comprising:
   in a power supply process, controlling a voltage step-down module to step down the voltage of the first battery and the second battery to supply power based on power supply demands; and
   controlling the power supply process to stop discharge in response to determining that the voltage of the second battery reaches the discharge cut-off voltage of the second battery.

14. The method according to claim 13, further comprising:
- controlling a balance module to balance the voltage of the first battery and the voltage of the second battery, so that the voltage of the first battery and the voltage of the second battery are the same during the power supply process.

15. The method according to claim 13, further comprising:
- detecting the voltage of the first battery and the voltage of the second battery before the first battery and the second battery are charged;
- controlling a balance module to balance the voltage of the first battery and the voltage of the second battery in response to the voltage of the first battery and the voltage of the second battery being different; and
- controlling a charging process of the first battery and the second battery to start after the voltage of the first battery and the voltage of the second battery are the same.

16. The method according to claim 13, further comprising:
- detecting the voltage of the first battery and the voltage of the second battery before the first battery and the second battery are charged;
- controlling a charging process of the battery with a lower voltage to start to charge the battery with the lower voltage; and
- controlling a charging process of the first battery and the second battery to start after the voltage of the first battery and the voltage of the second battery are the same.

17. An electric device, comprising an apparatus for power supply, wherein the apparatus for power supply comprises:
- a first battery which is a silicon negative lithium ion battery;
- a second battery which is a graphite negative lithium ion battery, wherein the graphite negative lithium ion battery is connected in series with the silicon negative lithium ion battery;
- a voltage step-down module; and
- a control module configured to control the first voltage step-down module to step down the voltage of the first battery and the second battery to supply power based on power supply demands, in a power supply process;
- wherein a discharge cut-off voltage of the first battery is lower than a discharge cut-off voltage of the second battery, and the control module is configured to control the power supply process to stop discharge in response to determining that the voltage of the second battery reaches the discharge cut-off voltage of the second battery.

* * * * *